US012794720B2

(12) United States Patent
Park

(10) Patent No.: US 12,794,720 B2
(45) Date of Patent: Nov. 10, 2026

(54) METHOD, SYSTEM AND NON-TRANSITORY COMPUTER-READABLE RECORDING MEDIUM FOR PROVIDING CONTENT-BASED SERVICE

(71) Applicant: Eun Ji Park, Seoul (KR)

(72) Inventor: Eun Ji Park, Seoul (KR)

( * ) Notice: Subject to any disclaimer, the term of this patent is extended or adjusted under 35 U.S.C. 154(b) by 282 days.

(21) Appl. No.: 18/563,365

(22) PCT Filed: Apr. 14, 2023

(86) PCT No.: PCT/KR2023/005099
§ 371 (c)(1),
(2) Date: Jul. 26, 2024

(87) PCT Pub. No.: WO2023/204533
PCT Pub. Date: Oct. 26, 2023

(65) Prior Publication Data

US 2025/0182151 A1 Jun. 5, 2025

(30) Foreign Application Priority Data

Apr. 18, 2022 (KR) ........................ 10-2022-0047847
Nov. 24, 2022 (KR) ........................ 10-2022-0159739

(51) Int. Cl.
*H04L 9/00* (2022.01)
*G06Q 10/40* (2026.01)
(Continued)

(52) U.S. Cl.
CPC ............... *H04L 9/50* (2022.05); *G06Q 10/40* (2026.01); *G06Q 10/46* (2026.01); *G06Q 30/018* (2013.01);
(Continued)

(58) Field of Classification Search
CPC .. G06Q 30/0207; G06Q 30/018; G06Q 40/04; G06Q 2220/00; G06Q 30/0208;
(Continued)

(56) References Cited

U.S. PATENT DOCUMENTS

2019/0164140 A1 5/2019 Pasupula
2020/0279249 A1 9/2020 Ta
(Continued)

FOREIGN PATENT DOCUMENTS

KR 10-1904208 B1 10/2018
KR 10-2020-0090582 A 7/2020
(Continued)

OTHER PUBLICATIONS

International Search Report and Written Report regarding Application No. PCT/KR2023/005099, dated Jul. 24, 2023, 9 pages.
(Continued)

*Primary Examiner* — Alexandru Cirnu
(74) *Attorney, Agent, or Firm* — Sheppard Mullin Richter & Hampton LLP

(57) ABSTRACT

A method for providing a content-based service is provided. The method includes the steps of: determining a quantity of rewards to be provided to a first node, with reference to information on a second node's participation in at least one content provided by the first node; determining a first index indicating a level of the second node's contribution to a value rise of the at least one content, and a second index indicating a level of interaction between the first node and the second node; and determining a right which the second node is allowed possess with respect to an object corresponding to the at least one content, with reference to the quantity of rewards, the first index, and the second index.

20 Claims, 2 Drawing Sheets

(51) Int. Cl.
*G06Q 10/46* (2026.01)
*G06Q 30/018* (2023.01)
*G06Q 30/0207* (2023.01)
*G06Q 40/04* (2012.01)

(52) U.S. Cl.
CPC ......... *G06Q 30/0207* (2013.01); *G06Q 40/04* (2013.01); *G06Q 2220/00* (2013.01)

(58) Field of Classification Search
CPC ........... G06Q 30/0226; G06Q 30/0242; G06Q 30/0273; G06Q 30/0276; G06Q 30/0277; G06Q 50/01; G06F 21/10; H04L 9/50
See application file for complete search history.

(56) References Cited

U.S. PATENT DOCUMENTS

| | | | | |
|---|---|---|---|---|
| 2022/0398538 | A1* | 12/2022 | Jakobsson | H04L 9/3213 |
| 2023/0075767 | A1* | 3/2023 | Bradley | G06Q 30/0234 |

FOREIGN PATENT DOCUMENTS

| | | | |
|---|---|---|---|
| KR | 10-2020-0093089 | A | 8/2020 |
| KR | 10-2020-0093784 | A | 8/2020 |
| KR | 10-2157767 | B1 | 9/2020 |
| KR | 10-2371071 | B1 | 3/2022 |

OTHER PUBLICATIONS

Extended European Search Report for Application No. 23792110.1, Jul. 9, 2025.

* cited by examiner

METHOD, SYSTEM AND NON-TRANSITORY COMPUTER-READABLE RECORDING MEDIUM FOR PROVIDING CONTENT-BASED SERVICE

CROSS-REFERENCE TO RELATED APPLICATION(S)

This application is a national phase of Patent Cooperation Treaty (PCT) International Application No. PCT/KR2023/005099 filed on Apr. 14, 2023, which claims priority to Korean Patent Application No. 10-2022-0047847 filed on Apr. 18, 2022 and Korean Patent Application No. 10-2022-0159739 filed on Nov. 24, 2022. The entire contents of PCT International Application No. PCT/KR2023/005099 and Korean Patent Application Nos. 10-2022-0047847 and 10-2022-0159739 are hereby incorporated by reference.

FIELD OF THE INVENTION

The present invention relates to a method, system, and non-transitory computer-readable recording medium for providing a content-based service.

BACKGROUND

A social network service (or social medium) refers to an online platform for assisting users to create and strengthen social relationships on the Internet by providing features that allow the users to communicate freely through messaging or the like, share information through various contents, and expand their network of contacts.

In general, platforms that provide social network services organize and manage databases of contents created by content providers, and most conventional platforms pursue profits through advertising and marketing activities based on these databases.

However, this mechanism for pursuing profits has limitations in that it allows provocative contents to be provided to content consumers, so that it acts as an entry barrier to content monetization for content providers who provide quality contents, and involves an environment that prevents content providers from fully focusing on content creation.

SUMMARY OF THE INVENTION

One object of the present invention is to solve all the above-described problems in the prior art.

Another object of the invention is to design a service mechanism for connecting content providers and content consumers with tokens provided on a blockchain network, so that quality content providers may pursue more profits.

Yet another object of the invention is to allow only verified contents to be converted into non-fungible tokens (NFTs) so that quality content providers may pursue more profits, and to contribute to the resolution of scams and information asymmetry.

The representative configurations of the invention to achieve the above objects are described below.

According to one aspect of the invention, there is provided a method for providing a content-based service, the method comprising the steps of: determining a quantity of rewards to be provided to a first node, with reference to information on a second node's participation in at least one content provided by the first node; determining a first index indicating a level of the second node's contribution to a value rise of the at least one content, and a second index indicating a level of interaction between the first node and the second node; and determining a right which the second node is allowed to possess with respect to an object corresponding to the at least one content, with reference to the quantity of rewards, the first index, and the second index.

According to another aspect of the invention, there is provided a system for providing a content-based service, the system comprising: a reward quantity determination unit configured to determine a quantity of rewards to be provided to a first node, with reference to information on a second node's participation in at least one content provided by the first node; an index determination unit configured to determine a first index indicating a level of the second node's contribution to a value rise of the at least one content, and a second index indicating a level of interaction between the first node and the second node; and an object management unit configured to determine a right which the second node is allowed to possess with respect to an object corresponding to the at least one content, with reference to the quantity of rewards, the first index, and the second index.

In addition, there are further provided other methods and systems to implement the invention, as well as non-transitory computer-readable recording media having stored thereon computer programs for executing the methods.

According to the invention, it is possible to design a service mechanism for connecting content providers and content consumers with tokens provided on a blockchain network, so that quality content providers may pursue more profits.

According to the invention, it is possible to allow only verified contents to be converted into non-fungible tokens (NFTs) so that quality content providers may pursue more profits, and to contribute to the resolution of scams and information asymmetry.

DETAILED DESCRIPTION OF THE INVENTION

Figure 1:
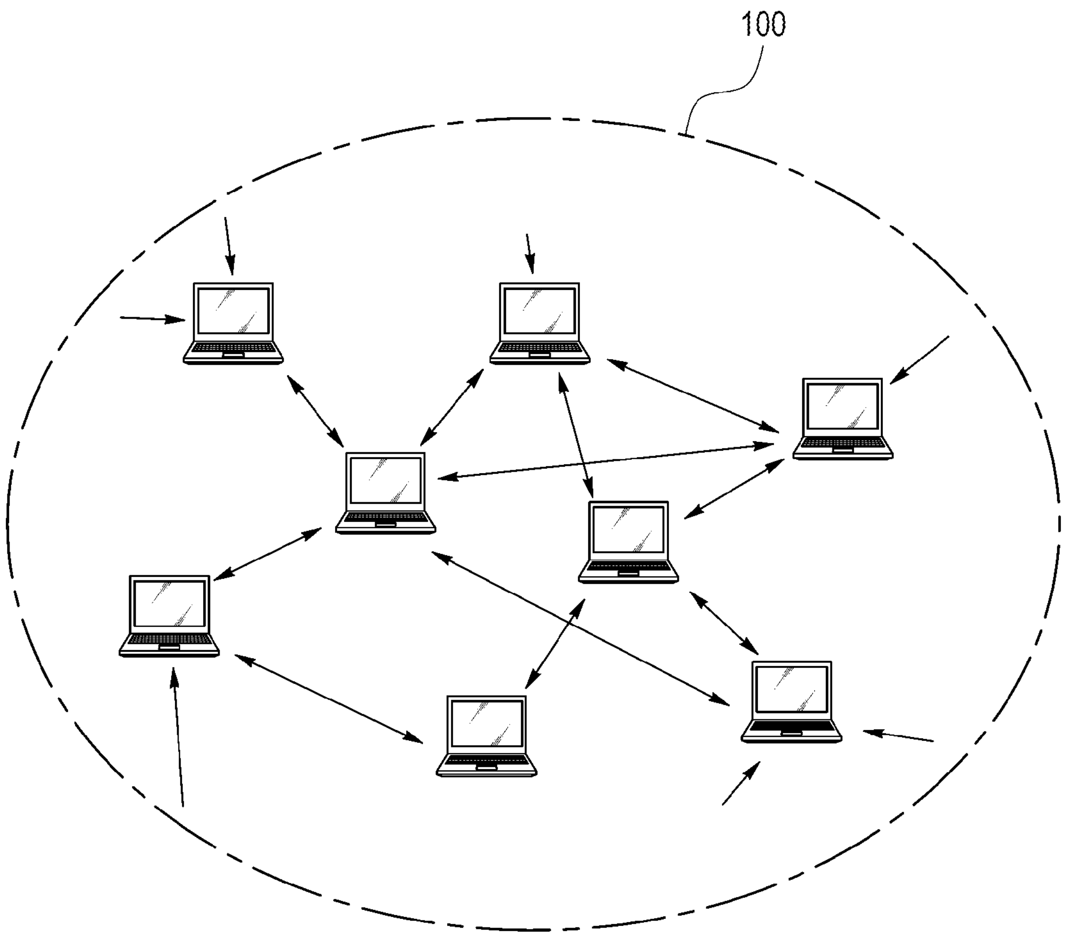
FIG. 1 schematically shows the configuration of an entire system for providing a content-based service according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the invention will be described in detail with reference to the accompanying drawings to enable those skilled in the art to easily implement the invention.

Configuration of the Entire System

FIG. 1 schematically shows the configuration of the entire system for providing a content-based service according to one embodiment of the invention.

As shown in FIG. 1, the entire system according to one embodiment of the invention may comprise a communication network (not shown) and a plurality of nodes 100.

First, the communication network according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network described herein may be the Internet or the World Wide Web (WWW). However, the communication network necessarily limited thereto, and may at least partially include known wired/wireless data communication networks, known telephone networks, or known wired/wireless television communication networks.

For example, the communication network may be a wireless data communication network, at least a part of which may be implemented with a conventional communication scheme such as radio frequency (RF) communication, WiFi communication, cellular communication (e.g., Long Term Evolution (LTE) communication), Bluetooth communication (more specifically, Bluetooth Low Energy (BLE) communication), infrared communication, and ultrasonic communication.

Next, the plurality of nodes 100 according to one embodiment of the invention are contact or access points capable of communicating with other nodes 100 via the communication network, and may encompass physical nodes such as servers, computers, laptops, smart phones, and tablet PCs (i.e., digital equipment having a memory means and a microprocessor for computing capabilities) or logical nodes such as applications, program modules, and virtual machines (i.e., virtual nodes). For example, the plurality of nodes 100 according to one embodiment of the invention may include a first node and a second node to be described later.

Meanwhile, the plurality of nodes 100 according to one embodiment of the invention may include a service provision system (not shown) according to the invention in the form of a program module such as an application or a widget. Further, the program module may be downloaded from an external application distribution server (not shown), an external system (not shown), or the like.

A blockchain network according to one embodiment of the invention may be a network in which information to be stored on the network is jointly verified by the plurality of nodes 100 participating in the network and the verified information is recorded and shared on the network, thereby ensuring the integrity and reliability of the recorded information without relying on an authorized third party. For example, the characteristics of the blockchain network may be at least partially similar to those of a conventional blockchain network such as Ethereum or Binance Smart Chain. Further, according to one embodiment of the invention, the blockchain network may encompass various types of blockchain networks such as a private blockchain network, a public blockchain network, and a combination of private and public blockchain networks.

Further, in the blockchain network according to one embodiment of the invention, cryptocurrencies may be issued and distributed for the operation, management, and the like of the network. For example, a participation token (another name for the participation token may be a HIFIVE (HIFI) token) may be issued and distributed on a testnet, and a main trading coin (another name for the main trading coin may be a DOCUER (DOCU) coin) may be issued and distributed on a mainnet. According to one embodiment of the invention, the main trading coin and the participation token may coexist on the mainnet, and may be converted into each other in a predetermined ratio (e.g., a ratio of one to one).

Next, the service provision system according to one embodiment of the invention may function to: determine a quantity of rewards to be provided to a first node, with reference to information on a second node's participation in at least one content provided by the first node; determine a first index indicating a level of the second node's contribution to a value rise of the at least one content, and a second index indicating a level of interaction between the first node and the second node; and determine a right which the second node is allowed to possess with respect to an object corresponding to the at least one content, with reference to the quantity of rewards, the first index, and the second index determined as above. According to one embodiment of the invention, the above functions of the service provision system (i.e., the content-based service) may be performed on the basis of at least one consensus algorithm operating on the blockchain network.

The configuration and functions of the service provision system according to the invention will be discussed in detail below. Meanwhile, the above description is illustrative although the service provision system has been described as above, and it is apparent to those skilled in the art that at least a part of the functions or components required for the service provision system may be implemented or included in the plurality of nodes 100 or an external system (not shown) (e.g., a separate server system built to provide the content-based service), as necessary. For example, according to one embodiment of the invention, a user may enable the provision of the content-based service according to the invention by using an application including at least a part of the functions of the service provision system (or blockchain network) according to the invention via the user's node, or using the node to access a website providing at least a part of the functions of the service provision system (or blockchain network) according to the invention.

Configuration of the Service Provision System

Hereinafter, the functions of the respective components of the service provision system crucial for implementing the invention will be discussed.

The service provision system according to one embodiment of the invention may comprise a reward quantity determination unit, an index determination unit, and an object management unit. According to one embodiment of the invention, at least some of the reward quantity determination unit, the index determination unit, and the object management unit may be program modules that communicate with an external system (not shown). The program modules may be included in the service provision system in the form of operating systems, application program modules, and other program modules, while they may be physically stored in a variety of commonly known storage devices. Further, the program modules may also be stored in a remote storage device that may communicate with the service provision system. Meanwhile, such program modules may include, but are not limited to, routines, subroutines, programs, objects, components, and data structures for performing specific tasks or executing specific abstract data types according to the invention as will be described below.

First, the reward quantity determination unit according to one embodiment of the invention may function to determine a quantity of rewards to be provided to a first node, with reference to information on a second node's participation in at least one content provided by the first node. Here, according to one embodiment of the invention, the first node may be an entity that creates and provides (or supplies or uploads) at least one content, and the second node may be an entity that consumes the at least one content provided by the first node.

According to one embodiment of the invention, the first node and the second node may utilize a content management platform operating on a blockchain network (the content management platform may have at least a part of the characteristics of a conventional social network service), wherein the content management platform may operate a paid membership policy separately from operating a sign-up policy. According to one embodiment of the invention, the first node may utilize the content management platform in a state where the first node has only signed up for the content management platform without paying for a paid membership (i.e., without being affiliated with the content management platform), in which case the first node may upload contents created by the first node to the content management platform, but may be restricted from monetizing the contents. Likewise, according to one embodiment of the invention, the second node may utilize the content management platform in a state where the second node has only signed up for the content management platform without paying for a paid membership (i.e., without being affiliated with the content management platform), in which case the second node may only consume contents uploaded to the content management platform but restricted from monetization.

According to one embodiment of the invention, while not affiliated with the content management platform as described above, the first node may provide a content created by the first node to the second node for free and review the second node's feedback, and then determine whether to pay for a paid membership for monetization. Further, according to one embodiment of the invention, while not affiliated with the content management platform as described above, the second node may consume contents restricted from monetization and then determine whether to pay for a paid membership to consume additional quality contents.

Next, according to one embodiment of the invention, in a state where the second node has paid for the paid membership of the content management platform on the basis of the above determination (i.e., the second node is affiliated with the platform), the reward quantity determination unit may assign a predetermined activity tier to the second node, and provide the second node with a quantity of participation tokens corresponding to the assigned activity tier. For example, the activity tiers of the content management platform may be classified into a premium tier, a standard tier, and a basic tier in order of the amount paid for the paid membership, and a greater quantity of participation tokens may be provided in order of the premium tier, the standard tier, and the basic tier. According to one embodiment of the invention, the second node may provide a predetermined quantity of tokens out of the provided participation tokens to at least one content uploaded to the content management platform (this action may be described as "high-fiving" the content) to indicate a preference for the content and a level of the preference. Further, according to one embodiment of the invention, the second node may store the at least one content uploaded to the content management platform in an archive, wherein storing the content in the archive may also be a means of indicating a preference for the content, separately from providing the participation tokens to the content.

Meanwhile, according to one embodiment of the invention, any of the participation tokens provided to the second node but not used by the second node within a predetermined period of time (e.g., within one month from when the participation tokens are provided) may be burned, and the amount of distributed participation tokens may be controlled through the burning process. However, according to one embodiment of the invention, for a particular activity tier (e.g., the premium tier) among the aforementioned activity tiers, the participation tokens may continue to accumulate without being burned even after the predetermined period of time, and it may also be possible to purchase additional participation tokens in addition to the participation tokens that are basically provided upon payment for the paid membership.

Next, according to one embodiment of the invention, in a state where the first node has paid for the paid membership of the content management platform on the basis of the above determination (i.e., the first node is affiliated with the platform), the first node may upload at least one content to the content management platform, and the reward quantity determination unit may determine the quantity of rewards to be provided to the first node, with reference to the information on the second node's participation in the at least one content uploaded by the first node, i.e., the quantity of participation tokens provided by the second node to the content. That is, according to one embodiment of the invention, the first node may be provided with rewards (i.e., participation tokens) only when it is affiliated with the content management platform. Here, the reward quantity determination unit according to one embodiment of the invention may allow the first node to be provided with a quantity of participation tokens equal to the quantity of participation tokens provided by the second node to the content, or to be provided with a quantity of participation tokens equal to the quantity of participation tokens provided by the second node to the content minus a predetermined percentage of fees.

Meanwhile, according to one embodiment of the invention, at least a part of the participation tokens provided to the first node may be burned upon occurrence of a predetermined event. For example, if a content uploaded by the first node to the content management platform is a harmful or illegal content (e.g., a content relating to violence, defamation, theft, drugs, or sexual offenses), and the first node is provided with participation tokens on the basis of the content, all of the provided participation tokens may be burned.

Next, the index determination unit according to one embodiment of the invention may determine a first index indicating a level of the second node's contribution to a value rise of the at least one content provided by the first node, and a second index indicating a level of interaction between the first node and the second node.

Here, the first index (which may be alternatively referred to as "Docuer Voting Power (DVP)") according to one embodiment of the invention may be determined with reference to a quantity of participation tokens provided by the second node to the at least one content provided by the first node (hereinafter, “first determinant”), a number of contents stored by the second node in the archive out of the at least one content provided by the first node (hereinafter, “second determinant”), a measure indicating activity persistence of the second node (e.g., the number of monthly accesses to the content management platform) (hereinafter, “third determinant”), a measure indicating consistency of contents consumed by the second node (e.g., consistency of categories of the consumed contents) (hereinafter, “fourth determinant”), and a quantity of participation tokens staked by the second node (hereinafter, “fifth determinant”). Further, the second index (which may be alternatively referred to as “Meter” or “Space”) according to one embodiment of the invention may be determined with reference to the first and second determinants.

According to one embodiment of the invention, each of the determinants for determining the first and second indexes may be a value normalized with respect to a predetermined interval (e.g., 0 to 100), and may be given a predetermined weight. For example, the first to fifth determinants constituting the first index may be given weights of 40%, 20%, 20%, 10%, and 10%, respectively, and the first and second determinants constituting the second index may be given weights of 50% and 50%, respectively. However, according to one embodiment of the invention, the weights (or percentages of the weights) given to the determinants are not limited to the above examples, and may be diversely changed as long as the objects of the invention may be achieved.

Next, the object management unit according to one embodiment of the invention may determine a right which the second node is allowed to possess with respect to an object corresponding to the at least one content provided by the first node, with reference to the quantity of rewards, the first index, and the second index determined as described above. Here, according to one embodiment of the invention, the object may include a non-fungible token (NFT) and the right may include a trading priority for the non-fungible token.

According to one embodiment of the invention, the object management unit may convert the at least one content provided by the first node into (or mint) a non-fungible token. Specifically, the at least one content may be converted into a non-fungible token by deploying a smart contract, which is written on the basis of a standard protocol for non-fungible tokens (e.g., ERC-721 or ERC-1155), on the blockchain network.

However, according to one embodiment of the invention, not all the at least one content provided by the first node may be converted into a non-fungible token, and only verified contents among the at least one content may be converted into non-fungible tokens.

Specifically, the object management unit according to one embodiment of the invention may verify the at least one content and convert the at least one content into a non-fungible token with reference to a result of the verification. More specifically, the object management unit according to one embodiment of the invention may convert the at least one content into a non-fungible token in response to the result of the verification satisfying a criterion included in the smart contract.

For example, the object management unit according to one embodiment of the invention may verify the at least one content with reference to the number of users who provide participation tokens to the at least one content. Specifically, the object management unit according to one embodiment of the invention may calculate the number of users who provide participation tokens to each of the at least one content, and determine that the content is verified if the calculated number of users exceeds a reference number of users (which may be included in the smart contract). According to one embodiment of the invention, only the verified content may be converted into a non-fungible token.

Meanwhile, according to one embodiment of the invention, the smart contract may be enabled or disabled for each of the at least one content, such that if the smart contract is disabled for any content, the above verification process is not performed for that content and the content cannot be converted into a non-fungible token. That is, according to one embodiment of the invention, it should be understood that the verification process is performed only when the smart contract is enabled for that content. According to one embodiment of the invention, the first node may determine whether to enable or disable the smart contract.

Next, the object management unit according to one embodiment of the invention may determine a right to prioritize purchase of a non-fungible token converted from a particular content, i.e., a trading priority for the non-fungible token. Here, according to one embodiment of the invention, whether the second node has the trading priority may be determined as below.

Specifically, the object management unit according to one embodiment of the invention may determine whether the second node has the trading priority for the non-fungible token, with reference to the quantity of participation tokens provided by the second node to the particular content, the first index of the second node, and the second index between the second node and the first node.

More specifically, the object management unit according to one embodiment of the invention may give predetermined weights to the quantity of participation tokens, the first index, and the second index, respectively (the quantity of participation tokens, the first index, and the second index may be normalized with respect to a predetermined interval (e.g., 0 to 100) and given weights of 30%, 30%, and 40%, respectively), and may determine whether the second node has the trading priority for the non-fungible token on the basis of an aggregate score obtained by summing the factors given the weights.

Here, according to one embodiment of the invention, the second node may be determined to have the trading priority for the non-fungible token if the second node’s aggregate score is ranked not lower than a predetermined place compared to the aggregate scores of other nodes (i.e., nodes that consume contents like the second node). For example, assuming that one non-fungible token is converted from the particular content, the second node may be determined to have the trading priority for the non-fungible token if the second node’s aggregate score is ranked the highest compared to the aggregate scores of the other nodes. As another example, assuming that a plurality of (e.g., five) non-fungible tokens are converted from the particular content, the second node may be determined to have the trading priority for the non-fungible token if the second node’s aggregate score is ranked not lower than the number of non-fungible tokens (e.g., the fifth place) compared to the aggregate scores of the other nodes.

Figure 2:
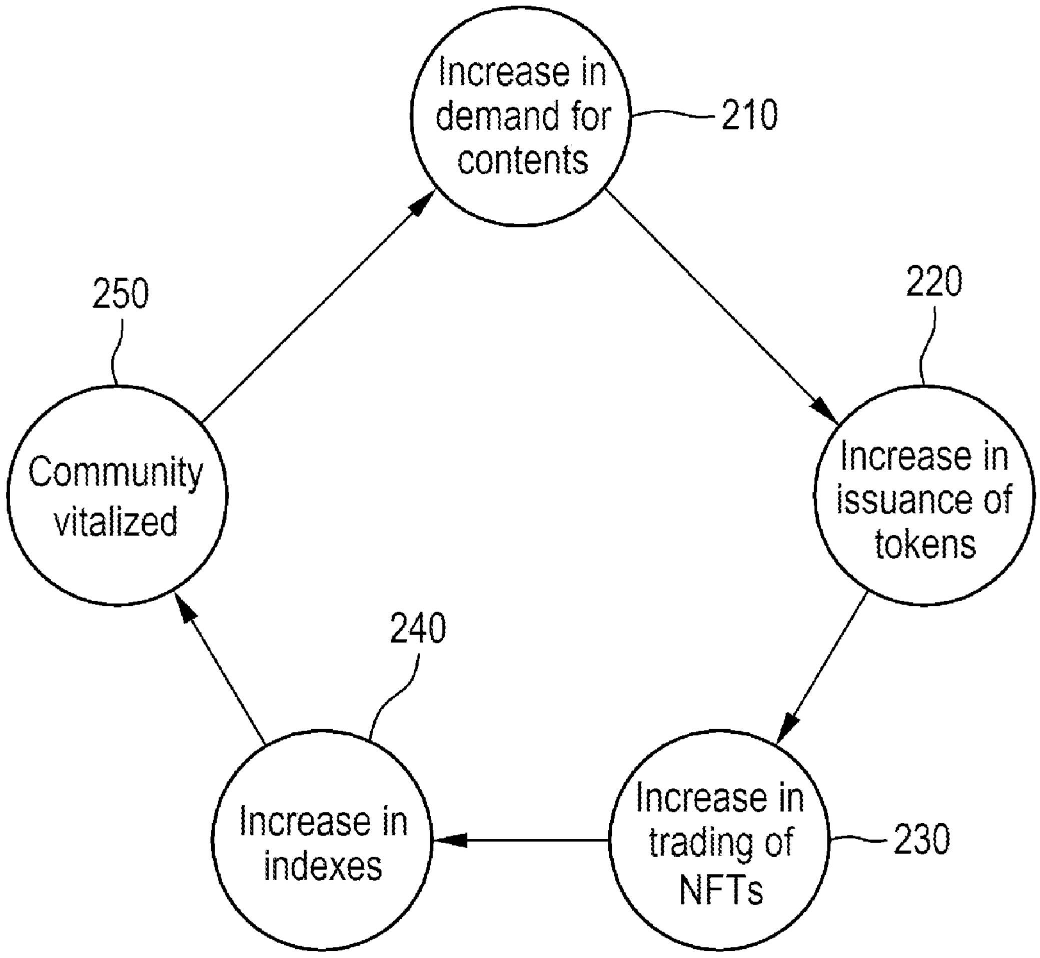
FIG. 2 shows the circulation structure of a content-based service according to one embodiment of the invention.

The functions provided by the service provision system (i.e., the content-based service) according to the invention have been discussed above in detail. The usefulness of the content-based service according to the invention will be discussed below with reference to FIG. 2. Specifically, demand for contents may increase as the number of nodes utilizing the content-based service increases (210), and then issuance of participation tokens (or main trading coins) may increase as the demand for contents increases (220). Further, participation in the contents (i.e., high-fiving) may increase so that trading of non-fungible tokens may increase as the issuance of participation tokens (or main trading coins) increases (230), and then the first and second indexes may increase as issuance of non-fungible tokens increases (240). Furthermore, as the first and second indexes increase, governance may accumulate so that community among the nodes may be vitalized, and the amount of distributed participation tokens (or main trading coins) may be controlled (250). As a result, the demand for contents may continue to increase (210). That is, according to the invention, token-market fit may be satisfied on the basis of the circulation structure shown in FIG. 2.

The embodiments according to the invention as described above may be implemented in the form of program instructions that can be executed by various computer components, and may be stored on a computer-readable recording medium. The computer-readable recording medium may include program instructions, data and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for providing a content-based service, the method being performed by one or more processors and comprising the steps of:

by at least one processor of the one or more processors, determining a participation signal associated with a first node, with reference to information on a second node's participation in at least one content provided by the first node;

by at least one processor of the one or more processors, determining a first index indicating a level of the second node's contribution to a value rise of the at least one content, and a second index indicating a level of interaction between the first node and the second node, wherein determining the first index and the second index is based at least on the participation signal;

by at least one processor of the one or more processors, computing a priority score for the second node based at least on the first index and the second index;

by at least one processor of the one or more processors, generating a ranking of a plurality of nodes for a state transition with respect to an object corresponding to the at least one content based at least on the priority score;

by at least one processor of the one or more processors, causing execution of a contract deployed on a blockchain network to validate a priority criterion corresponding to a node of the plurality of nodes, the priority criterion including:

(i) a verification criterion based on a number of distinct nodes providing participation indications with respect to the content, (ii) a ranking criterion based on a ranking corresponding to the node, and (iii) an enable or disable state of the contract; and by at least one processor of the one or more processors, triggering prioritized execution of the state transition when a node satisfies the priority criterion, and otherwise triggering rejection of the state transition.

2. The method of claim 1, wherein the participation signal is determined when the first node is affiliated with a platform for managing the at least one content.

3. The method of claim 1, wherein the second node is assigned a predetermined activity tier as the second node is affiliated with a platform for managing the at least one content, and the second node is provided with a quantity of blockchain-based tokens corresponding to the assigned activity tier.

4. The method of claim 3, wherein the participation signal is based on a quantity of blockchain-based tokens provided by the second node to the at least one content.

5. The method of claim 3, wherein any of the blockchain-based tokens not used by the second node within a predetermined period of time are burned.

6. The method of claim 1, wherein the state transition is associated with conversion of the at least one content into the object.

7. The method of claim 6, wherein the verification criterion includes a verification threshold that the a number of distinct nodes providing participation indications with respect to the content exceeds a specified number consistent with the contract.

8. The method of claim 7, wherein the contract deployed on the blockchain network associated with the at least one content is enabled or disabled by the first node.

9. The method of claim 1, wherein the object includes a non-fungible token (NFT) and the priority criterion comprises a trading priority for the non-fungible token.

10. The method of claim 1, wherein the enable or disable state specifies whether the contract is enabled or disabled.

11. A non-transitory computer-readable recording medium having stored thereon a computer program for executing the method of claim 1.

12. A system for providing a content-based service, the system comprising:

one or more processors; and memory storing instructions that, when executed by at least one processor of one or more processors, cause the system to:

determine a participation signal associated with a first node, with reference to information on a second node's participation in at least one content provided by the first node;

determine a first index indicating a level of the second node's contribution to a value rise of the at least one content, and a second index indicating a level of interaction between the first node and the second node, wherein determining the first index and the second index is based at least on the participation signal;

compute a priority score for the second node based at least on the first index and the second index;

generate a ranking of a plurality of nodes for a state transition with respect to an object corresponding to the at least one content based at least on the priority score;

cause execution of a contract deployed on a blockchain network to validate a priority criterion corresponding to a node of the plurality of nodes, the priority criterion including:

(i) a verification criterion based on a number of distinct nodes providing participation indications with respect to the content, (ii) a ranking criterion based on a ranking corresponding to the node, and (iii) an enable or disable state of the contract; and trigger prioritized execution of the state transition when a node satisfies the priority criterion, and otherwise triggering rejection of the state transition.

13. The system of claim 12, wherein the participation signal is determined when the first node is affiliated with a platform for managing the at least one content.

14. The system of claim 12, wherein the second node is assigned a predetermined activity tier as the second node is affiliated with a platform for managing the at least one content, and the second node is provided with a quantity of blockchain-based tokens corresponding to the assigned activity tier.

15. The system of claim 14, wherein the participation signal is based on a quantity of blockchain-based tokens provided by the second node to the at least one content.

16. The system of claim 14, wherein any of the blockchain-based tokens not used by the second node within a predetermined period of time are burned.

17. The system of claim 12, wherein triggering prioritized execution of the state transition comprises:

converting the at least one content into the object with reference to a result of verifying the at least one content.

18. The system of claim 17, wherein the verification criterion includes a verification threshold that the a number of distinct nodes providing participation indications with respect to the content exceeds a specified number consistent with the contract.

19. The system of claim 18, wherein the contract deployed on the blockchain network associated with the at least one content is enabled or disabled by the first node.

20. The system of claim 12, wherein the object includes a non-fungible token (NFT) and the priority criterion comprises a trading priority for the non-fungible token.

* * * * *